(12) United States Patent
Tapson

(10) Patent No.: US 7,002,603 B2
(45) Date of Patent: Feb. 21, 2006

(54) DATA PROCESSING APPARATUS AND METHOD OF PROCESSING DATA

(75) Inventor: Daniel Warren Tapson, Basingstoke (GB)

(73) Assignee: Sony United Kingdom Limited, Weybridge (GB)

(*) Notice: Subject to any disclaimer, the term of this patent is extended or adjusted under 35 U.S.C. 154(b) by 305 days.

(21) Appl. No.: 10/223,542

(22) Filed: Aug. 19, 2002

(65) Prior Publication Data

US 2003/0081857 A1    May 1, 2003

(30) Foreign Application Priority Data

Aug. 21, 2001 (GB) .................................. 0120332

(51) Int. Cl.
    G09G 5/00        (2006.01)
(52) U.S. Cl. ..................... 345/647; 345/611; 382/275
(58) Field of Classification Search ............... 382/100, 382/248, 260–265, 275; 345/611, 647–648; 348/241–252, 606–624; 358/3.26
    See application file for complete search history.

(56) References Cited

U.S. PATENT DOCUMENTS

| | | | |
|---|---|---|---|
| 5,353,117 A | | 10/1994 | Holman et al. |
| 5,394,483 A | * | 2/1995 | Daly ........................... 382/270 |
| 5,557,417 A | | 9/1996 | Ishii |
| 5,574,499 A | | 11/1996 | Nasu |
| 5,648,987 A | * | 7/1997 | Yang et al. ................... 375/232 |
| 6,421,636 B1 | * | 7/2002 | Cooper et al. ............... 704/205 |
| 6,483,927 B1 | * | 11/2002 | Brunk et al. ................. 382/100 |

* cited by examiner

Primary Examiner—Matthew C. Bella
Assistant Examiner—Po-Wei Chen
(74) Attorney, Agent, or Firm—Frommer Lawrence & Haug LLP; William S. Frommer

(57) ABSTRACT

A data processing apparatus is operable to determine non-linear distortion applied to an image in which template signals have been introduced into at least first and second frequency bands of the image respectively, the template signals having a predetermined relationship with each other. The apparatus comprises an image dividing processor operable to generate data representative of selected parts of the image, a transform detection processor operable to generate at least one parameter representative of a linear transformation applied to each of the parts of the image, and a non-linear transform processor operable to estimate parameters of a non-linear transformation representative of the non-linear distortion applied to the image from the linear transform parameters of at least two parts of the image.

The data processing apparatus provides a facility for determining parameters of a non-linear transform representative of the distortion applied to the image as a whole. The distortion is therefore evaluated by generating linear transform parameters for different parts of the image and then determining the non-linear transform parameters in accordance with a relationship with the linear transform parameters. The linear transform may be the Affine transform, the parameters determined being Affine transform parameters. The non-linear transform may be the Perspective transform or a Polynomial transform, the non-linear transform parameters being evaluated from the linear transform parameters.

41 Claims, 8 Drawing Sheets

DATA PROCESSING APPARATUS AND METHOD OF PROCESSING DATA

FIELD OF INVENTION

The present invention relates to data processing apparatus and methods for determining distortion of an image. The present invention also relates to data processing apparatus and methods operable to correct for distortion of an image.

BACKGROUND OF INVENTION

Images may be distorted by any process performed on the image. For example, if a data signal representing the image is recorded or communicated, the image may be distorted by processes performed in order to communicate or record the image data signal. In addition, unwanted disturbances may introduce distortion to the image, which are caused by natural phenomena such as noise, fading or interference.

SUMMARY OF INVENTION

An object of the present invention is to provide a data processing apparatus and method for detecting and/or correcting or at least reducing the effects of distortion applied to image data signals.

It is also an object of the present invention to provide an image processing apparatus operable to detect and recover data, which has been embedded in an image, from a distorted version of that image.

According to an aspect of the present invention there is provided a data processing apparatus operable to combine at least first and second template signals into first and second frequency bands respectively of an image data signal representative of an image, the template signals having a predetermined relationship with one another and being combined in the first and second bands with the effect that distortion of the data signal produces a relative change in frequency between the first and the second template signals.

The term frequency band refers to a range of two-dimensional frequencies forming part of a total range of frequencies from which an image data signal is comprised.

According to another aspect of the present invention there is provided a data processing apparatus operable to determine non-linear distortion of an image in which template signals have been introduced into at least first and second frequency bands of the image respectively, the template signals having a predetermined relationship with each other. The apparatus comprises a transform detection processor operable to generate at least one parameter representative of a linear transformation applied to each of the parts of the image, and a non-linear transform processor operable to estimate parameters of a non-linear transformation representative of the non-linear distortion applied to the image from the linear transform parameters of at least two parts of the image.

It has been observed that by introducing a template signal into different frequency bands of an image signal, linear distortion of the images, can be identified from a relative change of frequency of the template signal between each of the different frequency bands. In some embodiments, the template signal added to each of the different bands may be the same signal. The template signal in some embodiments may be a pseudo random noise signal. In other embodiments, the template signal in one of the plurality of bands may be formed from a version of components of the image signal from another of the frequency bands.

The term template signal as used herein is provided in order to distinguish the (template) signal used to identify distortion from the data signal with respect to which distortion is to be determined. The term "template" is therefore used to provide a reference, guide or training effect and any of these terms or other terms may be used as a substitute for "template". Accordingly the template signals are arranged to have a predetermined relationship with one another, such that by comparing the frequency components of the template signals, recovered from the frequency bands, a relative frequency change between the components of the template signals can be determined, which is indicative of distortion experienced by the data signals.

It has been found that distortion of an image can be evaluated in terms of the parameters of a linear transform representative of the distortion. In preferred embodiments the linear transform is the Affine transform. By relating the parameters of an Affine transform to the values of two dimensional co-ordinates representing an amount of frequency change between versions of the template signal recovered from the first and second bands, the parameters of the linear transform can be determined. Embodiments of the present invention provide a facility for determining an amount of non-linear distortion applied to an image. The distortion is determined by identifying parameters of a non-linear transform. This is effected by dividing the image into a plurality of parts. Under the assumption that the part of the image is small enough that the distortion can be approximated by a linear transform applied to this part of the image, the non-linear transform parameters can be evaluated by combining the linear transform parameters from the different parts of the image. The non-linear distortion for the image as a whole is therefore determined by generating linear transform parameters for different parts of the image and then determining the non-linear transform parameters in accordance with a predetermined relationship.

As will be explained, a predetermined relationship between the parameters of, for example, the Affine transform and the Perspective transform can be evaluated by mapping the Affine transform parameters onto the Perspective transform parameters. The mapping is effected in accordance with a polynomial function, which fits the Affine parameters for respective parts of the image to the Perspective transform parameters.

In some embodiments the template signals are introduced into the first and second frequency bands, by transforming the image into the Wavelet domain using a Wavelet transformer, introducing the template signals into first and second Wavelet bands and transforming the image back to the spatial domain. Correspondingly, the template signals can be recovered from the first and second bands of the image signal by transforming the image into the Wavelet domain using a Wavlet transformer.

As disclosed in [1], data may be embedded in material such as, for example, video material. This embedded data may be meta data, which identifies the content of the material. In another example the embedded data may be a unique or substantially unique identifier, which can be used to identify the material, providing the owner with a facility for asserting intellectual property rights in the material.

An example application for embodiments of the invention is to facilitate recovery of data, which has been embedded in material. For example, if the material is video material which has been distorted in some way, the distortion may have an effect of reducing the likelihood of correctly recovering the embedded data. For example, it is known that pirate copies of films can be produced by a person recording the film using a video camera in a cinema at which the film is being shown. The effect of recording the film using a video camera can distort the recorded film in accordance with a relative perspective view of the cinema screen from the camera. The distortion can have an effect of reducing the likelihood of correctly recovering the embedded data thereby preventing the owner from, for example, proving ownership and enforcing intellectual property rights in the film.

According to another aspect of the present invention there is provided a data processing apparatus operable to detect data embedded in material, the material having template signals present in at least first and second frequency bands respectively, the template signals having a predetermined relationship with each other. The apparatus comprises a distortion detection data processing apparatus operable to determine parameters of a non-linear transform representative of the distortion of the material, an inversion processor operable to receive the parameters representative of the non-linear transform determined by the distortion detection data processing apparatus and data representative of the material and to reverse the distortion of the material, and a data detector operable to recover the embedded data from the material.

In some embodiments, the transform, which is considered to represent the distortion applied to the image, is a linear transform such as the Affine transform, the parameter data representing at least four parameters. In other embodiments, the transform may be a non-linear transform such as the Perspective transform, the transform being represented as at least six parameters. The Affine transform is described in [2].

Various further aspects and features of the present invention are defined in the appended claims.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF PREFERRED EMBODIMENTS

Embodiments of the present invention can provide a facility for detecting an amount of distortion to any data-bearing signal. Embodiments of the present invention can also be arranged to correct for such distortion.

In order to illustrate the advantages provided by embodiments of the present invention, an example embodiment will be described with reference to detecting distortion of an image and for correcting for this distortion. A particular application of embodiments of the present invention is in the field of watermarking in which data is embedded into material in order, for example, to detect and/or protect ownership of the material.

Figure 1:
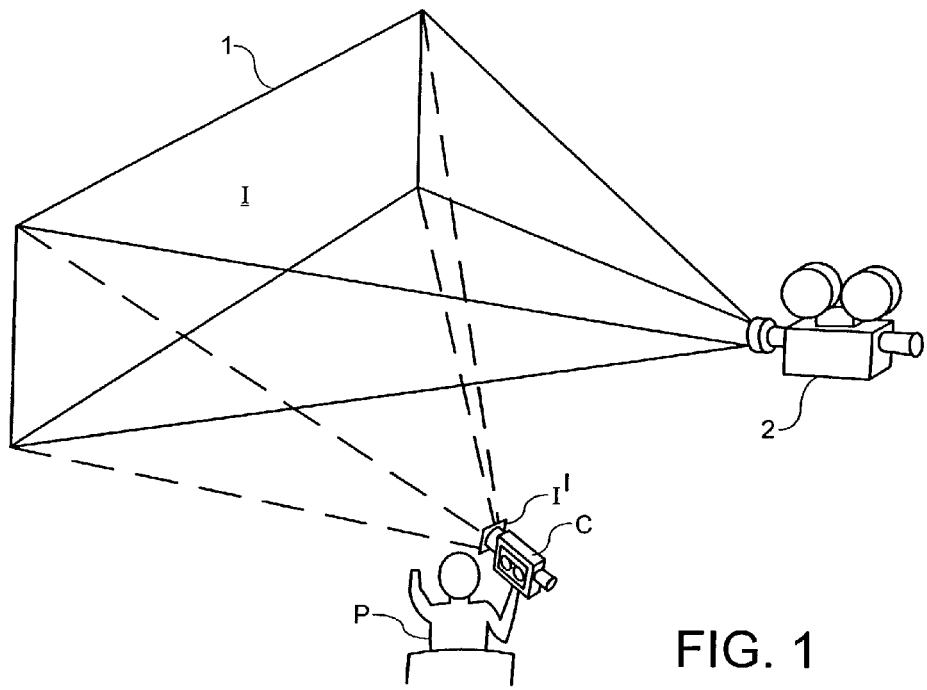
FIG. 1 is a diagram representing a cinema in which pirate copies of films are being created, by recording the film displayed in the cinema using a video camera.

It is known that pirate copies of films and video material are sometimes generated by recording the film or video material using a video camera or camcorder. As illustrated in FIG. 1, a pirate may enter a cinema and record a film, which is projected onto a screen 1 from a cinemagraphic projector 2. Typically, however, the pirate P will be sitting at an angle to the screen so that the image recorded by the video camera C will be distorted with respect to the original image.

Viewing and recording an image I at an angle can result in distortion of the image I when the recorded image I' is reproduced. In many imaging systems, detected images I' may be subjected to distortion, as a result of the position of a camera capturing the images I with respect to the scene. The position of the camera can have an effect of altering the apparent dimensions of the scene geometry. This can be represented as Perspective irregularities being introduced into the image.

Generally, distortion can be represented as an Affine transform [2], which has four parameters, or a Perspective transform having six parameters. As such, by determining the parameters of the distortion in terms of either an Affine or Perspective transform, a distorted image can be corrected for a range of Affine or Perspective distortion by reversing the transform of the image in accordance with the determined parameters. Affine and Perspective transforms may be classed generally as linear and non-linear transforms respectively.

One embodiment of the present invention provides a facility for detecting the degree of Affine transform from the image itself. Accordingly, the Affine transform can be corrected. As a result, data, which may have been embedded in an image, may be more likely to be correctly recovered.

In order to detect and determine an amount of Affine distortion applied to an image, embodiments of the present invention are arranged to introduce a predetermined template signal into different frequency bands of a data signal with respect to which the distortion is to be detected. In some embodiments the predetermined template signal may be different in each band, although the template signals may be arranged to have a predetermined relationship with each other. As explained, the predetermined relationship is such that a relative frequency change between frequency components of the template signal can be detected.

One Dimensional Data Signal

Figure 2:
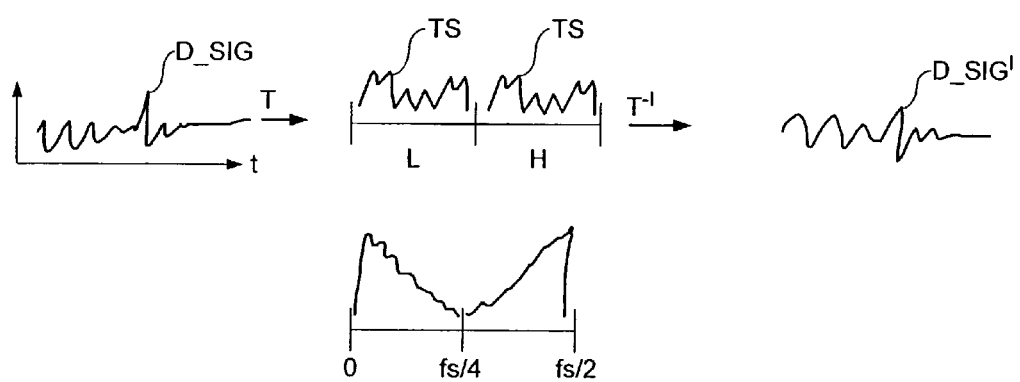
FIG. 2 provides an illustrative representation of the effect of distortion on a template signal introduced into different frequency bands of a data signal.

An example, of a data signal in which distortion may be detected and corrected by an embodiment of the present invention is represented in FIG. 2, as a plot of amplitude with respect to time. The data signal may represent, for example, an audio signal, which is transformed by an appropriate transform into a transform domain in which high H and low L frequency bands are distinguished and represented separately. For example, a convenient transform is the Wavelet transform or for a disctrete time digitally sampled version of the data signal, the Discrete Wavelet Transform (DWT). Thus, as a result of the Wavelet transform, the high and low H, L bands are provided in the transform domain.

In the Wavelet transform domain, a template signal TS is added to each of the bands. In preferred embodiments, the template signal is a pseudo-random noise signal, which may be generated from a Pseudo-Random Bit Sequence (PRBS). The Wavelet transform domain signal to which the template signal TS has been introduced into different Wavelet bands is then inverse transformed $T^{-1}$ into the time domain. The template signal may be introduced into the Wavelet transform domain signal by embedding the template signal as explained in [1] and briefly at the end of the description of specific embodiments of the invention.

Using a pseudo-random noise signal as the template signal has an advantage that the effect of adding the template signal in the time domain prevents or at least reduces the likelihood of the template signal being detected. For example, if the data signal is an audio signal, then the effect of adding a pseudo-noise signal will be less likely to be perceivable to a person listening to the audio signal, than a non noise-like signal.

The present invention utilises a phenomenon that distortion of the data bearing signal has an effect of changing differently the relative frequency of the template signal in each of the bands to which the signal has been added. Thus, by identifying the difference in the frequency components at respective frequencies of the template signal after the data bearing signal has been distorted, an indication is provided of the relative distortion.

Figure 3:
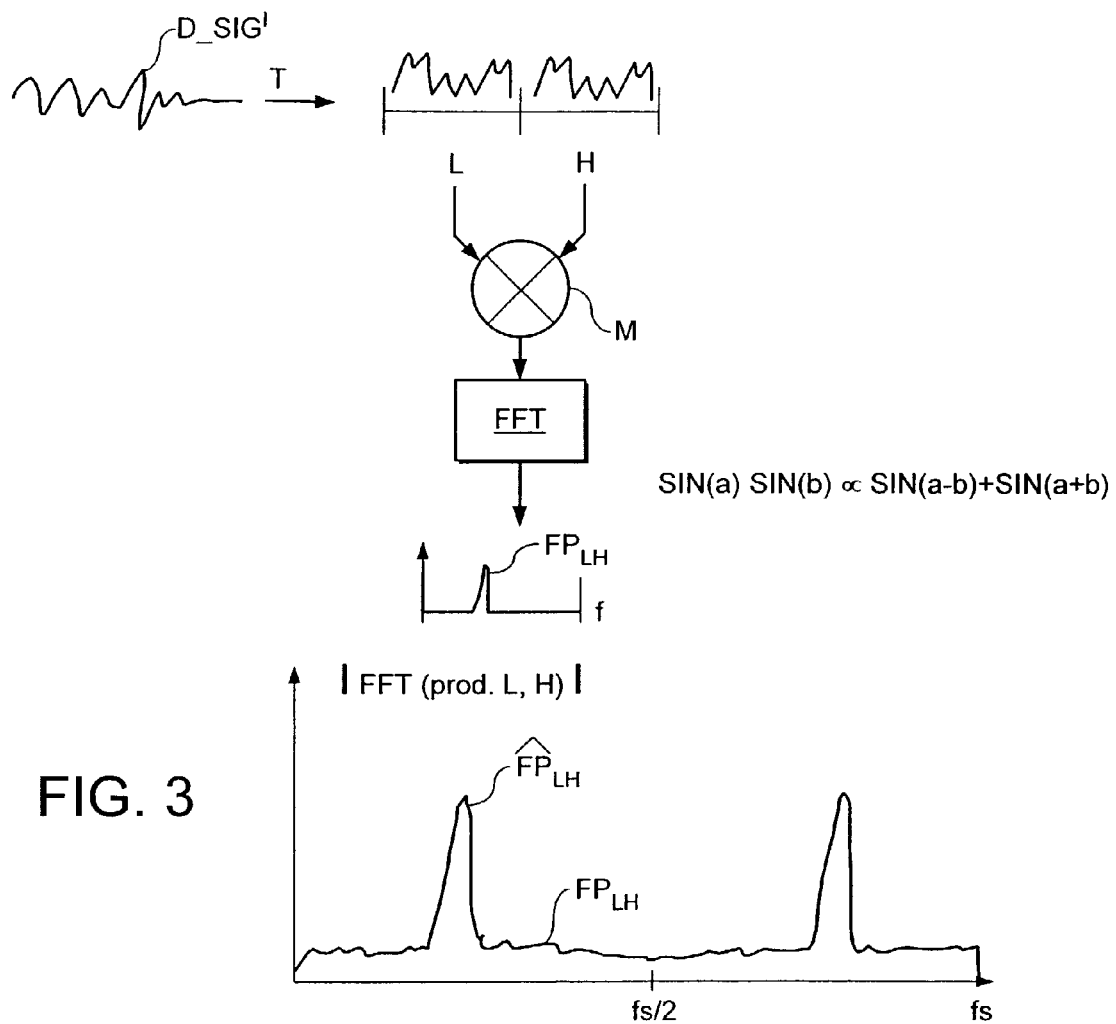
FIG. 3 is a graphical representation of the magnitude of frequency domain samples produced by transforming the product of the template signal samples from different frequency bands into the frequency domain.

For the one dimensional data bearing signal D_SIG', shown in FIG. 2, a general description of the distortion detecting process is illustrated in FIG. 3. In FIG. 3, the data signal D_SIG' is again transformed into the Wavelet transform domain in which the template signal in the high H and low L bands may be detected and recovered. In order to determine the distortion applied to the data signal D_SIG', the difference between the respective frequency components of the template signal is determined.

An efficient way of detecting the difference is to multiply respective samples of the template signal from each of the bands and to transform the product samples produced into the frequency domain. This is illustrated in FIG. 3 by a multiplier M which is arranged to multiply respectively the signal samples from the template signal from each respective band, and to form Fast Fourier Transform (FFT) of the resulting product signals.

It is observed that, in the well known relationship, sinAsinB is proportional to sin(A−B)+sin(A+B). Thus, by forming the product of the template signal in the time domain and transforming this into the frequency domain, a signal with a component proportional to the difference frequency is provided. Accordingly, an output signal $FP_{L,H}$ formed at the output of the FFT is illustrated in FIG. 3. The signal sample of the output signal with the highest magnitude $\hat{FP}_{L,H}$ in the frequency domain provides an indication of the relative distortion experienced by the data signal.

Two Dimensional Data Signal

Figure 4:
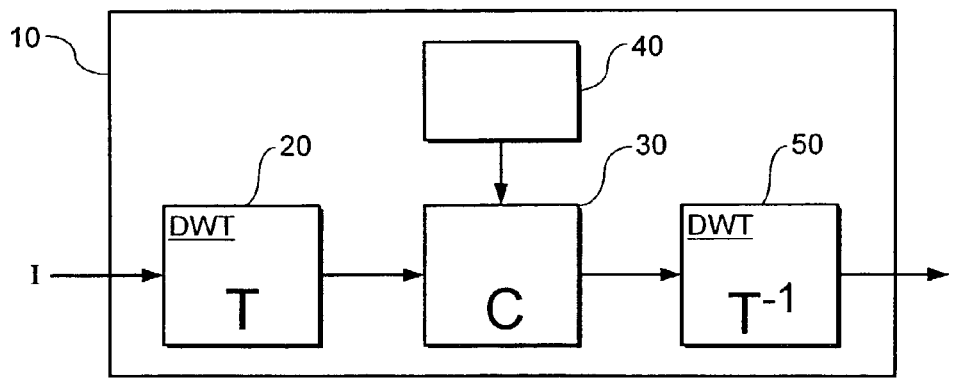
FIG. 4 is a schematic block diagram of a data processing apparatus operable to introduce a template signal into different frequency bands of a data signal.
Figure 5:
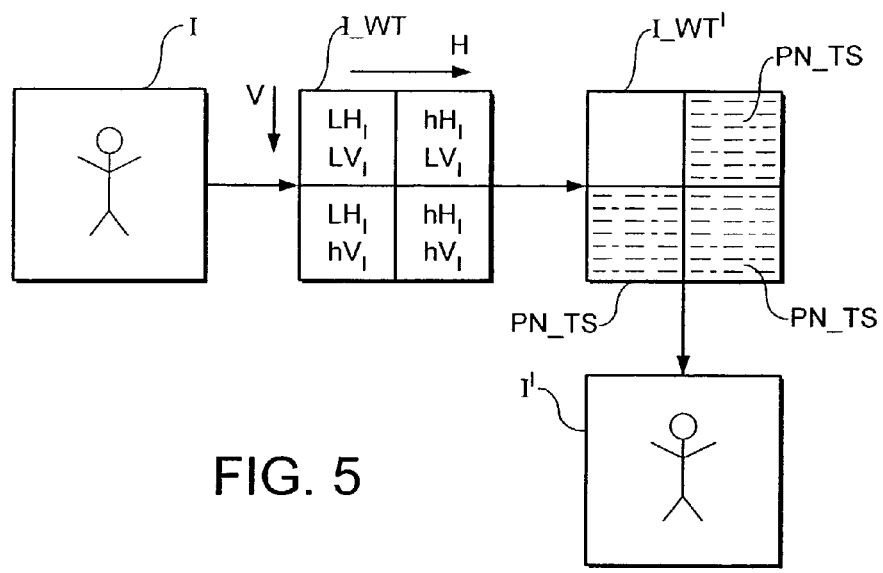
FIG. 5 is a representation of the effect of operations on an image performed by the data processing apparatus shown in FIG. 4.

For a two-dimensional signal, such as an image, a data processor for embedding a template signal into a two-dimensional image is shown in FIG. 4. Correspondingly, the effect of each of the components of the data processor shown in FIG. 4 is illustrated in FIG. 5.

In FIG. 4, a data processor 10 receives a signal representing an image I. The image I is received by a transform processor 20. The transform processor 20 operates to perform a Discrete Wavelet Transform on the image I to produce a level one Wavelet transformed image I_WT comprising four bands defined with respect to vertical and horizontal frequencies V, H (FIG. 5). The transform processor 20 produces a first order Wavelet transform comprising the four bands $lH_1\ lV_1$, $hH_1\ lV_1$, $lH_1\ hV_1$, $hH_1\ hV_1$. The discrete Wavelet transformed image is fed to a combiner 30. The combiner 30 is also arranged to receive a pseudo-random noise signal from a pseudo-random noise generator 40. The pseudo-random noise signal generated by the generator 40 is produced from a Pseudo Random Bit Sequence (PRBS). Although the PRBS produces a signal with noise like qualities, the signal is predetermined and is therefore predictable at the receiver. For the present example embodiment, the pseudo-random noise signal forms a template signal PN_TS. The combiner 30 combines the pseudo-random noise template signal into three of the bands $hH_1\ lV_1$, $lH_1\ hV_1$, $hH_1\ hV_1$, of the Wavelet transformed image I_WT to form as shown in FIG. 5 a version of the Wavelet transform image I_WT including the pseudo-noise template signal PN_TS. An inverse transform processor 50 is arranged to receive the Wavelet transformed image I_WT' to perform an inverse Wavelet transform to recover a version of the image I' to which the template signal has been introduced into the three bands.

The template signals are introduced into each band by adding or subtracting a factor α to a corresponding Wavelet coefficient in the band, depending on the sign of a corresponding bit in the template data signal. A brief explanation of how data may be embedded in data signals such as video material is provided at the end of this description.

As already indicated for the one dimensional case, the use of a pseudo-random noise signal as a template signal has an effect of reducing the likelihood that the presence of the template signal will be detected from the processed image I'.

For the present example embodiment, the pseudo-random noise signal is not added to the horizontal low vertical $lH_1\ lV_1$ frequencies band. This is because this band contains the low frequency components of the image. The low frequency components of the image are more visually perceptible than the high frequency components of the image. As such, the addition of noise into this band $lH_1\ lV_1$ would be more noticeable in the time domain version of the image I'.

Alias and Wavelets

A mathematical analysis illustrating that distortion of a data signal can be detected by estimating an amount of relative frequency shift of a template signal added to different bands is provided in the following paragraphs.

For the one-dimensional example consider the following cosine wave of frequency $f_1$ and phase p, defined for discrete samples $S_x$ with sampling frequency f.

$$S_x = \exp(kf_1 x + ip) + \exp(-(kf_1 x + ip)) \quad k = i2\pi/f_s.$$

It is well known that $$\exp(ix) = \exp(i(x + 2\pi))$$

and hence that $$S_x = \exp(xkf_2 + ip) + \exp(-(xkf_2 + ip))$$

where $$f_2 = f_1 + sf_s \text{ for all integer } s$$

The values of $f_2$ are the alias frequencies of $f_1$, which are different frequencies that when discretely sampled at $f_s$ yield the same values as $f_1$. For all $f_1$ there exists at most one unique alias frequency $f_2$ such that $$|f_2| < |f_s/2|$$

Two Dimensional Wavelet Frequency Analysis

In two dimensions when using a rectangular sampling grid, a general frequency may be represented by, $$S_{xy} = \exp(k_x f_{x1} x + k_y f_{y1} y + ip) + \exp(-(k_x f_{x1} x + k_y f_{y1} y + ip))$$

$$k_x = 2i\pi/f_{sx} \quad k_y = 2i\pi/f_{sy}.$$

Correspondingly therefore, two dimensional frequencies have a two dimensional family of alias frequencies, $$f_{2x} = f_{1x} + sf_{sx}, \quad f_{sy} = f_{1y} + tf_{sy} \text{ for all integers } s, t$$

again there is at most one unique pair $f_{2x}, f_{2y}$ such that $$|f_{2x}| < f_{sx}/2 \text{ and } |f_{2y}| < f_{sy}/2$$

In two dimensions it is important to keep track of the signs of the x and y frequency components, as changing the sign of one will reflect the frequency.

An explanation of the operation of the data processor according to the example embodiment of the present invention is provided as follows:

As already indicated above, the first level Wavelet transform of a one-dimensional signal consists of two bands H and L. The low band L is generated, for example, by low pass filtering the input signal at $f_s/4$ and then sub-sampling by a factor of two. The high pass band H is generated for example by high pass filtering and then sub-sampling by two.

Consider the action of the low band Wavelet filter on a frequency f with phase p, in the image such that $|f| < f_s/4$.

$$S_x = \exp(kfx + p) + \exp(-(kfx + p)) \text{ where } |f| < f_s/4.$$

Low pass filtering should not affect the content of the data signal. Sub-sampling by two doubles the frequency.

$$T_x = S_{2x}(\text{subsampling by 2})$$

$$T_x = \exp(2kfx + p) + \exp(-(2kfx + p))$$

Under the condition that $|2f| < f_s/2$ no alias is observed. So the low band of the discrete Wavelet transform maps a frequency f, $$DWT_L(f, p) = (2f, p) \quad |f| < f_s/4$$

Now consider the action of the high pass Wavelet filter on a high frequency component of the image, $$S_x = \exp(kfx + p) + \exp(-(kfx + p)) \text{ where } f_s/4 < f < f_s/2$$

High pass filtering at $f_s/4$ should not affect this frequency. Sub-sampling by two has the effect of doubling the sampling frequency.

$$T_x = \exp(2kfx + p) + \exp(-(2kfx + p))$$

But $f_s/2 < |2f| < f_s$ hence the observed frequency will be the alias $2f - f_s$.

$$|2f - f_s| < f_s/2$$

So the high band of the discrete Wavelet transform maps a positive frequency f $$DWT_H(f, p) = (2f - f_s, p) \quad f_s/4 < f < f_s/2.$$

Similarly for negative f, $$DWT_H(f, p) = (2f + f_s, p) \quad f_s/4 < -f < f_s/2.$$

Note that a positive high band Wavelet frequency, results in a negative image frequency. For real one-dimensional signals the sign of the Wavelet frequency has no material effect. However for a two-dimensional signal, the sign of the horizontal or vertical frequency component will "reflect" the wave.

From the above relationships, analogous functions for the inverse Wavelet transform can be formed, $$IDWT_L(f, p) = (f/2, p) \quad |f| < f_s/4$$

$$IDWT_H(f, p) = ((f - f_s)/2, p) \quad f_s/4 < f < f_s/2$$

$$((f + f_s)/2, p) \quad f_s/4 < -f < f_s/2$$

For the example embodiment illustrated in FIGS. 4 and 5, the two dimensional discrete Wavelet transform produced by the transform processor 20 may be achieved by the application of the one dimensional transform to the rows of pixels, and then to the resulting columns of pixels. This produces the four bands labelled bands $lH_1 lV_1, hH_1 lV_1, lH_1 hV_1, hH_1 hV_1$ shown in FIG. 5.

Applying the above functions to an data signal such as to an image having two dimensional frequency components, a two dimensional discrete Wavelet transform is provided, which may be represented by the following equations:

$$S_{nm} = \exp(k_x f_x n + k_y f_y m + p) + \exp(-(k_x f_x n + k_y f_y m + p))$$

$$DWT_{LL}(f_x, f_y, p) = (DWT_L(f_x), DWT_L(f_y), p)$$

$$DWT_{HL}(f_x, f_y, p) = (DWT_H(f_x), DWT_L(f_y), p)$$

$$DWT_{LH}(f_x, f_y, p) = (DWT_L(f_x), DWT_H(f_y), p)$$

$$DWT_{HH}(f_x, f_y, p) = (DWT_H(f_x), DWT_H(f_y), p)$$

The effect of forming the inverse Wavelet transform on the template signal in the Wavelet transform domain.

$$IDWT_{LL}(f_x, f_y, p) = (IDWT_L(f_x), IDWT_L(f_y), p)$$

$$IDWT_{HL}(f_x, f_y, p) = (IDWT_H(f_x), IDWT_L(f_y), p)$$

$$IDWT_{LH}(f_x, f_y, p) = (IDWT_L(f_x), IDWT_H(f_y), p)$$

$$IDWT_{HH}(f_x, f_y, p) = (IDWT_H(f_x), IDWT_H(f_y), p)$$

Detection and Inversion of an Affine Transform

As already explained, images may be distorted in a way which approximates to an Affine transform. For the present example, the image may form part of a video signal recorded by the camcorder from the film as a result of the illegal copying process illustrated in FIG. 1. In order therefore to increase the likelihood of being able to recover data embedded within an image I, produced from this recording a data processor is arranged to analyse the distorted image and to estimate parameters representing the distortion. In particular, the parameters may be representative of an Affine transformation of the image.

Figure 6:
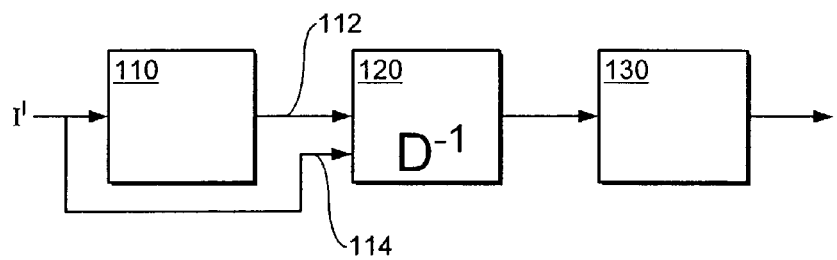
FIG. 6 is a schematic block diagram of a data processing apparatus operable to identify distortion applied to an image.

A data processor for removing the distortion and for recovering the embedded data in the image is shown in FIG. 6. In FIG. 6, the distorted image is received by a transform detection processor 110 which is operable to determine the transform parameters which represent the distortion applied to the image. The image and the transform parameters, which are determined by the transform detection processor 110, are then fed to an inverse transform processor 120, via first and second input channels 112, 114. The distortion to the image I represented by the transform parameters is removed by the inverse transform processor 120, using the transform parameters generated by the transform detection processor 110. The undistorted image recovered by the inverse transform processor 120 is then fed to a recovery processor 130.

The recovery processor 130 is arranged to recover data embedded in the image in order to identify the owner of the image. An explanation of recovering data embedded in an image is provided at the end of this description of the preferred embodiments.

The transform detection processor 110 is arranged to detect and generate parameters representative of the transform applied to the image. The transform detection processor is shown in more detail in FIG. 7 with the corresponding effect on the reproduced image represented in FIG. 8. In general, however the two-dimensional case corresponds substantially to process steps taken to detect distortion of the one-dimensional signal already explained above and with reference to FIG. 3.

Figure 7:
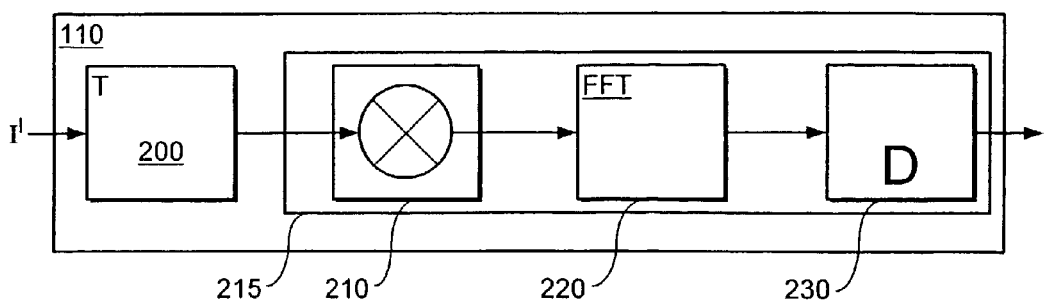
FIG. 7 is a schematic block diagram of a transform detection processor shown in FIG. 6.

In FIG. 7, the image signal may have been recovered from a recording of the original image such as for example when the camcorder is used to capture and record the images of the film as illustrated in FIG. 1. The image signal is processed to correct distortion represented as a transform applied to the image, which is representative of the view of the camcorder with respect to the display screen.

Figure 8:
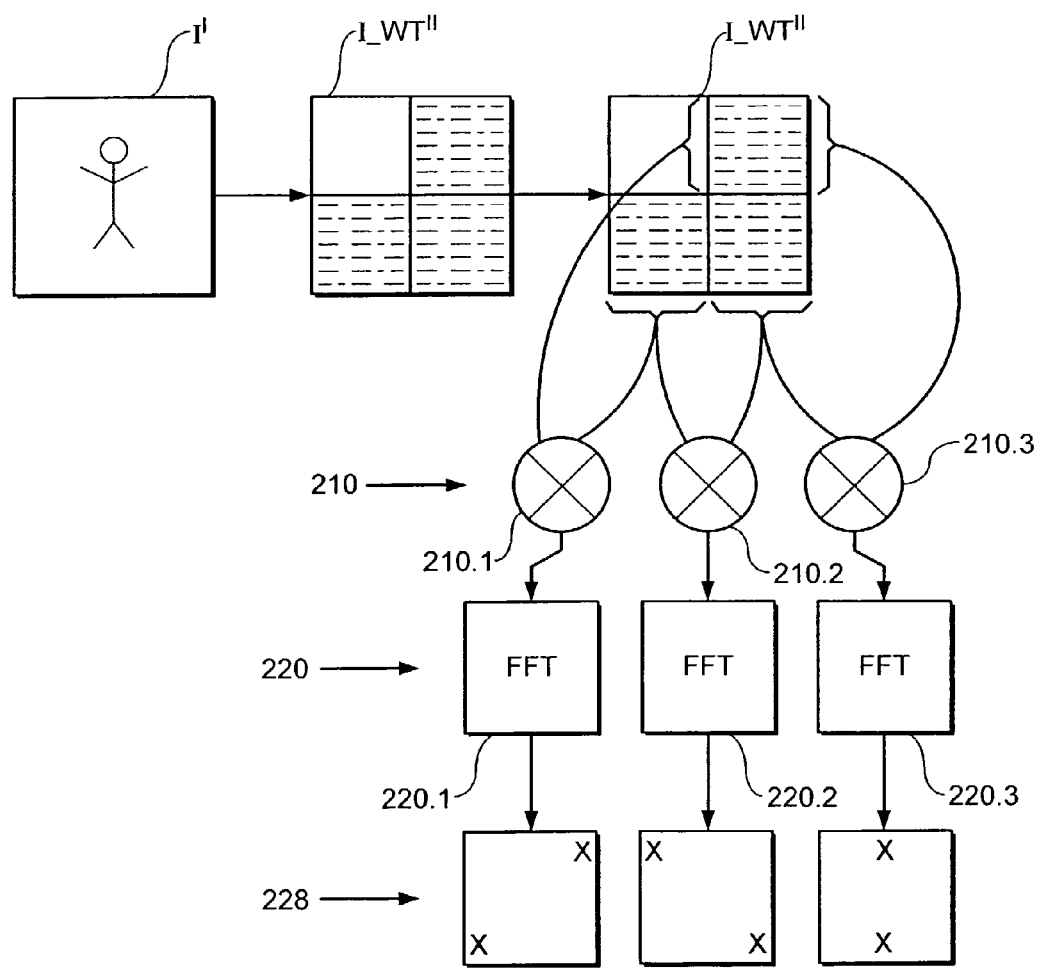
FIG. 8 is a representation of the effect of operations on an image performed by the transform detection processor shown in FIG. 7.

The image signal I' is received by a transform processor 200 within the transform detection processor 110. The transform processor 200 performs a DWT to convert the image into the Wavelet transform domain. In the present example embodiment, a level one transform is produced as is illustrated in FIG. 8. As shown in FIG. 8, the image I is converted into the Wavelet transform domain I_WT'" which corresponds to the Wavelet transform representation shown in FIG. 5. The Wavelet transform image I_WT'" is then fed from the transform processor 200 to a detection processor 215, comprising a product forming processor 210, a Fourier transform processor 220 and a transform parameter processor 230.

As explained, with reference to the one-dimensional case, the product forming processor 210 is arranged to multiply respective signal samples of the template signal present in two of the three bands of the Wavelet transform image. However, as shown in FIG. 8, since there are three bands into which the template signal has been embedded, there are three combinations of multiplication, which can be performed between signal samples of the template signal from two of the three bands. The product forming processor 210 is represented in FIG. 8 by three multipliers having two inputs each of which is arranged to receive samples from one of the bands of the Wavelet transformed image I_WT'". Each of the multipliers 210.1, 210.2, 210.3 is therefore arranged to multiply corresponding samples from the template signal in two of the bands to which the inputs are connected. Accordingly, the three possible combinations of multiplication from the bands form the product signal samples produced by the product forming processor 210. The product signal samples are then fed to a Fourier transform processor 220. The Fourier transform processor performs a Discrete Fourier Transform to generate a frequency domain representation of the product signal samples.

The Fourier transform processor 220 is represented in FIG. 8 by three Fourier transform processors 220.1, 220.2, 220.3, each of which forms a two-dimensional Fourier transform of the vertical and horizontal product signals produced by multiplying the respective signal samples from the template signal from each of the bands.

As shown in FIG. 8, a result 228 of the Fourier transform in the frequency domain is to produce a peak at horizontal and vertical frequencies values at each of a pair of points. The pairs of points are represented as X in the two-dimensional frequency domain representation and provide an indication of horizontal and vertical frequency co-ordinates, which represent the distortion experienced by the image.

Each of the three two-dimensional frequency domain indications of the distortion is fed to a transform parameter estimator 230. The transform parameter estimator 230 can estimate the Affine transform parameters from the horizontal and vertical frequency values of the peak signal samples produced by the Fourier transform processor 220. However, in order to provide an improved estimate of the Affine transform parameters, each of the frequency co-ordinate pairs are used in combination to refine the estimate of the transform parameters.

The estimation of the two-dimensional Affine transform from the peak two-dimensional frequency signal samples values is calculated by the transform parameter processor 230 by representing the Affine transform parameters as a two-by-two matrix.

Affine Transform Frequency Analysis

Figure 9A:
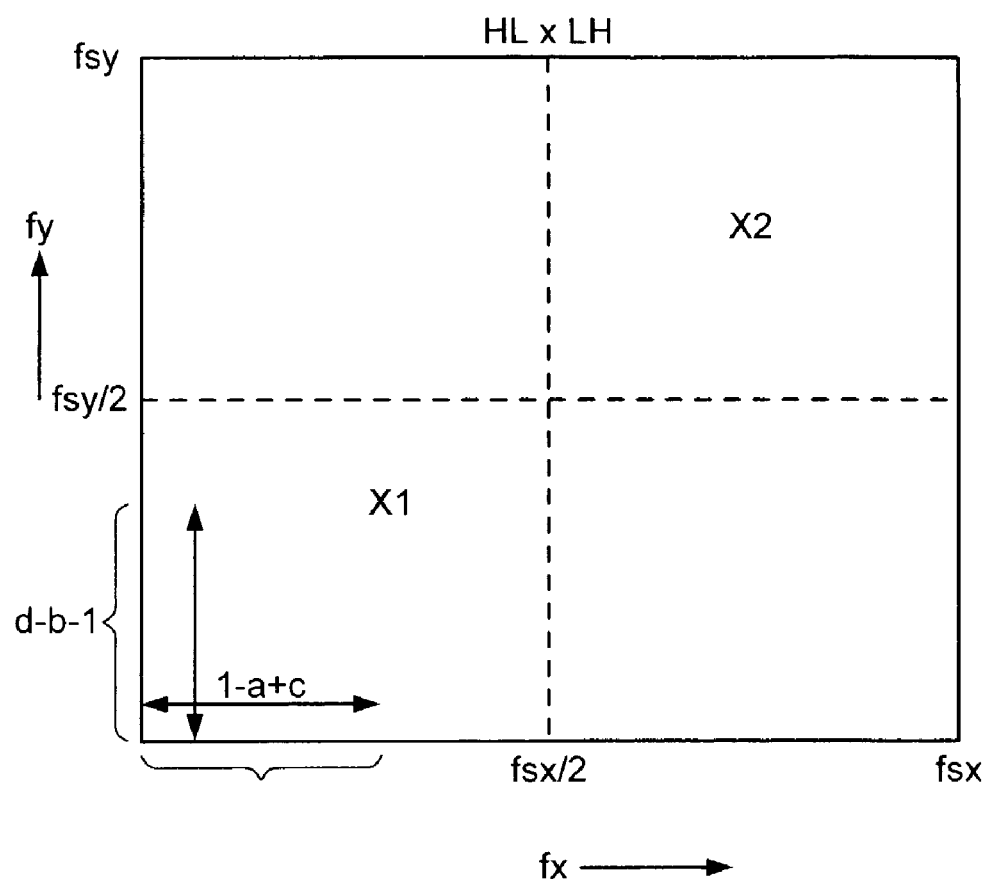
FIG. 9A is a representation of a two dimensional graphical form of horizontal and vertical frequency domain samples resulting from a frequency transform of a product of template samples from the HL×LH Wavelet bands.
Figure 9B:
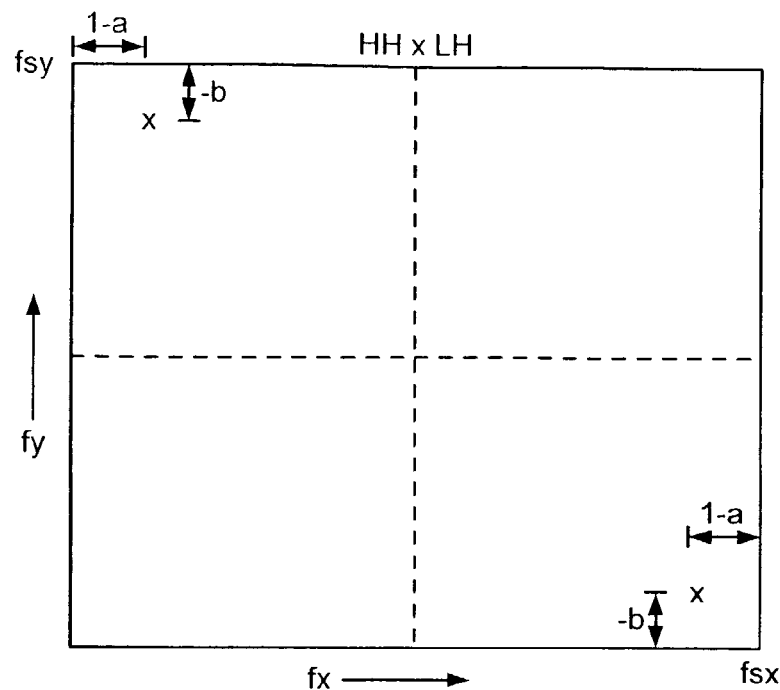
FIG. 9B is a corresponding two dimensional graphical form of horizontal and vertical frequency domain samples for the HH×LH product bands, and FIG. 9C correspondingly provides a two dimensional frequency representation for the HL×HH product bands.
Figure 9C:
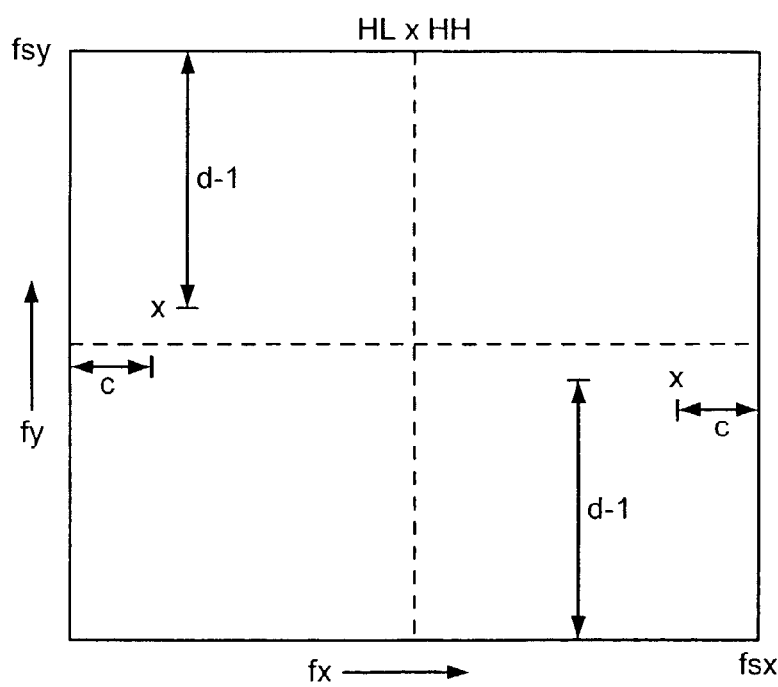

The operation of the transform parameter processor 230 which estimates the Affine transform parameters from the two dimensional frequency peak signal samples will now be explained with reference to FIGS. 9A, 9B and 9C. FIG. 9A provides a representation of the horizontal and vertical values of signal samples with the peak value marked as X1 and X2 for the two-dimensional frequency domain product samples from the $hV_1 lH_1 xlV_1 hH_1$ bands (HL×LH).

It will now be explained how the Affine transform parameters are evaluated from the peak two-dimensional frequency values. A general two-dimensional Affine transform can be represented by a 2×2 matrix. Applying the transform results in the transformed coordinates, $$[u\ v]^T = M_f [x\ y]^T \quad M_f = \begin{vmatrix} a_f b_f \\ c_f d_f \end{vmatrix}$$

Where u and v are the pixel co-ordinates of a transformed point, and a, b and c, d are the four parameters which correspond to an Affine transform.

A translation may be included in the transform by adding an additional vector, which has the effect of shifting the pixel with respect to the origin of the original.

$$[uv]^T = M_f[x\ y]^T + [o_{xf} o_{yf}]^T$$

Where $o_{xf}$, $o_{yf}$ are an additional vector representing a shift of the pixel with respect to the origin. If the matrix M is non-singular, then there exists another matrix and vector that will produce the inverse transform, $$[x \ y]^T = M_i[u \ v]^T + [o_{xi} \ o_{yi}]^T$$

$$\text{where } M_i = M_f^{-1} = \begin{vmatrix} a_i b_i \\ c_i d_i \end{vmatrix} \quad [o_{xi}, o_{yi}] = -M^{-1}[o_{xf} o_{yf}]$$

and $a_i$, $b_i$, $c_i$, $d_i$, represent the Affine transform parameters which will invert the Affine transform representing the distortion applied to the image or pixel.

Consider the action of the above transform on the following two-dimensional cosine wave, which may be considered as one of the frequency components of the template signal:

$S(x, y) = \exp(xk_x f_x + yk_y f_y + ip) + \exp(-(xk_x f_x + yk_y f_y + ip))$, then IF $T(u, v) = T(S(x, y))$, then $T(u, v) = \exp(uk_x(a_f f_x + c_f f_y) + v k_y(b_f f_x + d_f f_y) + i[d o_x f_x / f_{sx} + d o_y f_y / f_{sy} + p]) + \exp(-(uk_x(a_f f_x + c_f f_y) + v k_y(b_f f_x + d_f f_y) + i[d o_x f_x / f_{sx} + d o_y f_y / f_{sy} + p])$ So the Affine transform maps an image cosine wave, to a cosine wave of different frequency, $\text{AFFINE}_M(f_x, f_y, p) = ((a f_x + c f_y), (b f_x + d f_y), d o_x f_x / f_{sx} + d o_y f_y / f_{sy} + p)$ Affine Transform of a Wavelet Transformed Data Signal Consider a single frequency component of a Wavelet band, $f_x, f_y, p, 0 < f_x < f_{sx}/2, 0 < f_y < f_{sy}/2$ As mentioned above, the Affine transform parameters, which represent the distortion, applied to an image utilises a characteristic that the Affine transform alters the frequency components differently. The template signal is therefore affected differently, depending on the Wavelet bands in which the template signal is present, but noting that the difference is independent of the initial frequency in the band.

First assume that the component signal in the $lH_1lV_1$ band, is transformed using a Discrete Wavelet Transform. This provides:

$DWT_{LL}(\text{AFFINE}_M(IDWT_{LL}(f_x, f_y, p)))$

Expanding the functions gives, $DWT_{LL}(\text{AFFINE}_M(IDWT_{LL}(f_x, f_y, p))) =$ $((a f_x + c f_y), (b f_x + d f_y), d o_x f_x / f_{sx} + d o_y f_y / f_{sy} + p)$ Similarly for the other bands:

$DWT_{HL}(\text{AFFINE}_M(IDWT_{HL}(f_x, f_y, p))) = ((a f_x + c f_y + 2 f_{sx}(1 - a)),$ $(b f_x + d f_y + 2 f_{sy}(-b)), d \ o_x[f_x / f_{sx} - 1] + d \ o_y f_y / f_{sy} + p)$ $DWT_{LH}(\text{AFFINE}_M(IDWT_{LH}(f_x, f_y, p))) = ((a f_x + c f_y + 2 f_{sx}(-c)),$ $(b f_x + d f_y + 2 f_{sy}(1 - d)), d \ o_x f_x / f_{sx} + d \ o_y[f_y / f_{sy} - 1] + p)$ $DWT_{HH}(\text{AFFINE}_M(IDWT_{HH}(f_x, f_y, p))) = ((a f_x + c f_y + 2 f_{sx}(1 - a - c)),$ $(b f_x + d f_y + 2 f_{sy}(1 - b - d)), d \ o_x[f_x / f_{sx} - 1] + d \ o_y[f_y / f_{sy} - 1] + p)$ Note that all four of the output frequencies are very similar. As such, an expression can be formed for a general Wavelet band BB. The transformed frequency component signal for the DWT is of the form:

$DWT_{BB}(\text{AFFINE}_M(IDWT_{BB}(f_x, f_y, p))) =$ $((C^X + D^X_{BB}), (C^Y + D^Y_{BB}), C^P + D^P_{BB})$ where $C^X = a f_x + b f_y \qquad C^Y = c f_x + d f_y$ $C^P = d \ o_x f_x / f_{sx} + d \ o_y f_y / f_{sy} + p$ $D^X_{LL} = 0 \qquad D^Y_{LL} = 0 \qquad D^P_{LL} = 0$ $D^X_{HL} = 2 f_{sx}(1 - a) \qquad D^Y_{HL} = 2 f_{sy}(-b) \qquad D^P_{HL} = -d \ o_x$ $D^X_{LH} = 2 f_{sx}(-c) \qquad D^Y_{LH} = 2 f_{sy}(1 - d) \qquad D^P_{LH} = -d \ o_y$ $D^X_{HH} = 2 f_{sx}(1 - a - c) \qquad D^Y_{HH} = 2 f_{sy}(1 - b - d) \qquad D^P_{HH} = -d \ o_x - d \ o_y$ As will be appreciated from the above equations and analysis, in the Wavelet transform domain, the effect of the Affine transform can be resolved independently of the value of the frequency component signal in the two dimensional frequencies $f_x$, $f_y$.

Product of Transformed Wavelet Bands

If an Affine transform is applied to the resulting image, the distorted image will have the frequencies given above in the three Wavelet domain bands.

Now consider the following products of the Wavelet bands formed by multiplying each sample of one Wavelet band with the corresponding sample of the other band, $HL \times LH = HL \times LH$ $HH \times LH = HH \times LH$ $HL \times HH = HL \times HH$ The Wavelet bands of the transformed image contain the frequencies.

HL; $C^X + D^X_{HL}$, $C^Y + D^Y_{HL}$, $C^P$

LH; $C^X + D^X_{LH}$, $C^Y + D^Y_{LH}$, $C^P$

HH; $C^X + D^X_{HH}$, $C^Y + D^Y_{HH}$, $C^P$

Forming the products using the rule sin(A)sin(B)=sin(A+B)+sin(A−B), provides:

$HL \times LH; D^X_{HL}-D^X_{LH}, D^Y_{HL}-D^Y_{LH}, D^P_{HL}-D^P_{LH}$ $HH \times LH; D^X_{HH}-D^X_{LH}, D^Y_{HH}-D^Y_{LH}, D^P_{HH}-D^P_{LH}$ $HL \times HH; D^X_{HL}-D^X_{HH}, D^Y_{HL}-D^Y_{HH}, D^P_{HL}-D^P_{HH}$ Expanding gives:

$HL \times LH; 2f_{sx}(1-a+c), 2f_{sy}(d-b-1), -\mathbf{d}o_x+\mathbf{d}o_y$ $HH \times LH; 2f_{sx}(1-a), 2f_{sy}(-b), -\mathbf{d}o_x$ $HL \times HH; 2f_{sx}(c), 2f_{sy}(d-1), \mathbf{d}o_y$ Therefore, placing the same frequency in three Wavelet bands, performing an inverse Wavelet, applying an Affine transform and/or a translation, applying a Wavelet transform and forming the above products, results in a frequency that is dependent on the applied Affine transform. The frequency component is independent of the actual frequency of the template signal, phase and shift of the image representative of the applied translation.

FIG. 9A provides an example of a pair of frequency peak values for the HL×LH band pair. As shown in FIG. 9A, the horizontal axis provides values of horizontal frequency in the Fourier transform domain from 0 to $f_{sh}$, which is the sampling frequency in the horizontal direction. The vertical axis in FIG. 9A provides values of vertical frequency in the Fourier transform domain from 0 to $f_{sv}$, which is the vertical sampling frequency. As such, a position at half the value on each axis corresponds respectively to half the value of the horizontal and vertical sampling frequencies $f_{sh}/2$, $f_{sv}/2$. Accordingly, the frequency values for both the horizontal and vertical frequency components alias either side of half the vertical and horizontal sampling frequency values. For this reason the peak value X1 is reflected about the value corresponding to half the vertical and horizontal sampling frequencies at a point X2. The pair of points X1, X2 therefore appear in the two dimensional Fourier transform domain representation of the band product pair HL×LH. Correspondingly the peak two dimensional frequency values in the other two band product pairs, shown in FIGS. 9B and 9C, will be paired with values either side of half of the value of the vertical and horizontal sampling frequencies.

As indicated in FIG. 9A, the peak values of the horizontal and vertical frequencies X1, X2 correspond to co-ordinates in the horizontal and vertical dimensions which correspond with the Affine transform parameters which have been experienced by the image. For the HL×LH band product pairs, the peak two-dimensional frequency peak value corresponds to $f_v=d-b-1$ and $f_h=1-a+c$, according to the above equation. Correspondingly, the values of the peak horizontal and vertical frequency point in the other two band products HH×LH, HL×HH as shown in FIGS. 9B and 9C are respectively $f_v=-b$, $f_h=1-a$ and $f_v=d-1$, $f_h=c$, according to the other equations above. Therefore with the measured values of the peak horizontal and vertical frequency point in each of the three band product pairs, the above equations can be solved to determine the values of the Affine transform parameters a, b, c, d. As will be appreciated this can be achieved in several ways. In one embodiment, the values of a, b, c, and d are varied over all possible values and for each set of values, the horizontal and vertical frequency values of the corresponding two dimensional frequency point are added for each of the three band product pairs. The set of parameter values which produce the sum with the greatest magnitude are then determined to be the Affine transform parameters representing the distortion applied to the image.

Having detected the transform parameters, the Affine transform is inverted by the inversion process 120, shown in FIG. 6, to recover the original perspective of the image. The data embedded in the image may be therefore more likely to be recovered by the de-embedding processor 130.

The data processor represented in FIG. 7 is arranged to reverse the effect of an Affine transform distortion to an image. However, in some cases the image may be distorted more severely which can be represented as a Perspective transform. As mentioned above, the Perspective transform has six parameters as compared with four with which the Affine transform can be represented.

Figure 10:
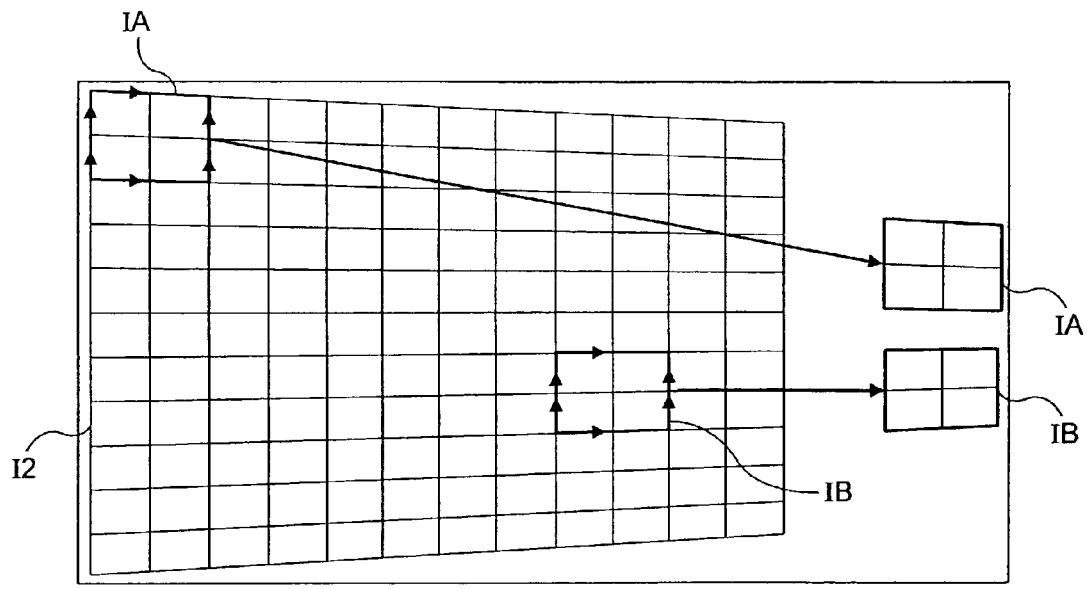
FIG. 10 is a schematic representation of an image which has been distorted by a Perspective transform.

Distortion to an image which is representative of a Perspective transform may itself be represented as different Affine transform parameters being present in different parts of the image. This is represented in FIG. 10 where different parts of an image 12 suffer from different amounts of Affine transform as a result of a Perspective transform applied to the overall image. This is illustrated by a grid drawn on the image 12, for sections of the image 12, IA and IB. When compared side-by-side, the different sections IA, IB shows different Affine distortion, which corresponds to different parameters. However, as illustrated by these two parts of the image IA, IB, the sides of each section are still parallel, indicating that the local distortion applied to the image can still be represented as an Affine transform.

An embodiment of the present invention is arranged to evaluate Perspective transform parameters which models distortion applied to an image. Rather than relying on a property of the whole image, like for example an autocorrelation surface, an assumption is made that by dividing the image into small enough sections, the local transform experienced by a small section of the image will be Affine. This local Affine transform can be used with the Affine transforms on other parts of the image to approximate a global perspective map of the image. Accordingly, a Perspective transform may be represented as corresponding parameters and reversed.

Figure 11:
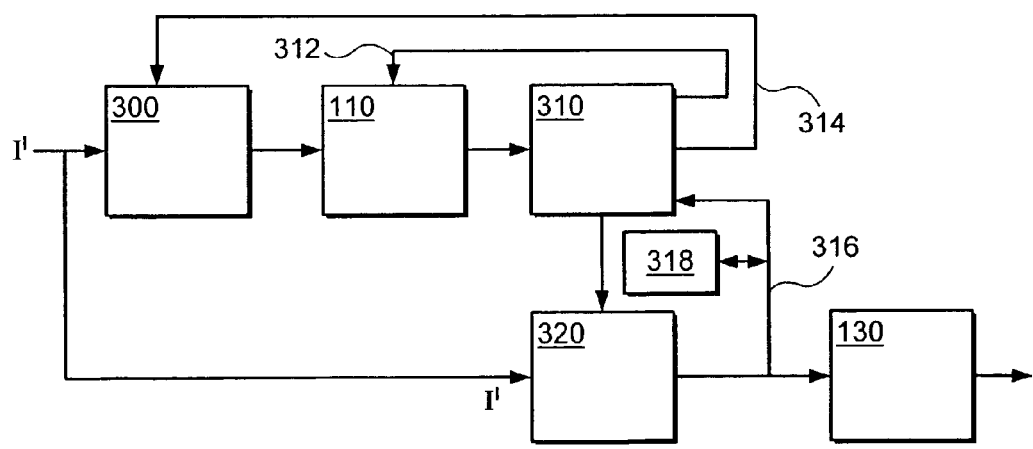
FIG. 11 is a schematic block diagram of a data processing apparatus operable to detect and correct distortion of an image, which has suffered Perspective distortion.

FIG. 11 provides an illustration of a data processing apparatus which is arranged to analyse and estimate Perspective transform parameters, which represent distortion applied to an image.

In FIG. 11, the image I' is received by an image dividing processor 300. The image dividing processor 300 is arranged to divide the picture, as illustrated in FIG. 10, into smaller local areas. For example, the extreme corners of the image may be extracted and analysed first in order to determine whether a Perspective transform has been applied to the image. This is determined from differences in the Affine transform parameters detected for these local areas. Accordingly, the extracted local areas are fed to a transform detection processor 110 corresponding to that shown in FIG. 7. The transform detection processor shown in FIG. 11 however generates Affine transform parameters corresponding to the distortion experienced locally by the sections of the image fed from the image dividing processor 300. The Affine transform parameters corresponding to these locally distorted areas are then fed to a Perspective transform processor 310. From the local Affine transform parameters, the Perspective transform is estimated by the Perspective transform processor 310 in accordance with a process described in the following sections.

Application of Affine Transform Estimator to Perspective Transforms

This section describes how these local Affine transforms can be used to approximate a global perspective map.

Derivatives of the Perspective Transform

A general Perspective transform may be given by the following equations:

$$x=(Au+Bu+C)/(Gu+Hv+1)$$

$$y=(Dv+Ev+F)/(Gu+Hv+1)$$

Where u, v is the destination location and x, y is the source location. Therefore in comparison to the Affine transform, the Perspective transform requires six parameters. Assuming small angles of pitch and yaw, approximate first order partial derivatives can be calculated as follows:

$$dx/du(u, v)=A(1-Gu-Hv)+(Au+Bv+C)(-G)$$

$$dx/dv(u, v)=B(1-Gu-Hv)+(Au+Bv+C)(-H)$$

$$dy/du(u, v)=D(1-Gu-Hv)+(Du+Ev+F)(-G)$$

$$dy/dv(u, v)=E(1-Gu-Hv)+(Du+Ev+F)(-H)$$

Differentiating again provides the following six second order partial derivatives:

$$d^2x/du^2 = -2AG$$
$$d^2x/dvdu = -AH - BG$$
$$d^2x/dv^2 = -2BH$$
$$d^2y/du^2 = -2DG$$
$$d^2y/dvdu = -DH - EG$$
$$d^2y/dv^2 = -2EH$$

The Perspective transform processor 310 first calculates Affine transform parameters for the local parts of the image produced by the image dividing processor, corresponding to small tiles of the input image. This provides M as a function of the destination pixel position u, v.

$$M(u, v) = \begin{vmatrix} a(u, v) & b(u, v) \\ c(u, v) & d(u, v) \end{vmatrix}$$

Differentiating the Affine transform with respect to u, v $$[x\ y]^T = M[u\ v]^T + [o_x\ o_y]^T \text{ where } M_i = \begin{vmatrix} a & b \\ c & d \end{vmatrix}, \text{ produces:}$$

$$\frac{dx}{du} = a \quad \frac{dx}{dv} = b$$

$$\frac{dy}{du} = c \quad \frac{dy}{dv} = d$$

As a result, the approximate local Affine transform parameters a, b, c, d provide an approximation of these first order derivatives, as a function of u, v. The rate of change corresponding to the Perspective transform is reflected by the change in Affine transform parameters. This is modelled by curve fitting to planes of the form:

$$a(u, v)=a_0+u\ a_u+v\ a_v$$

$$b(u, v)=b_0+u\ b_u+v\ b_v$$

$$c(u, v)=c_0+u\ c_u+v\ c_v$$

$$d(u, v)=d_0+u\ d_u+v\ d_d$$

As indicated by the above analysis the results of the Affine detection algorithm a, b, c, d, gives an approximation of the second order partial derivatives of x and y with respect to u and v.

| | | |
|---|---|---|
| $a_0 = dx/du(0, 0)$ | $b_0 = dx/dv(0, 0)$ | $c_0 = dy/du(0, 0)$ |
| $d_0 = dy/dv(0, 0)$ | | |
| $a_u = d^2x/du^2$ | $b_u = d^2x/dvdu$ | $c_u = dy^2/du^2$ |
| $d_u = d^2y/dudv$ | | |
| $a_v = d^2x/dudv$ | $b_v = d^2x/dv^2$ | $c_v = dy^2/dudv$ |
| $d_v = d^2y/dv^2$ | | |

Therefore the Perspective transform can be determined from these equations. Comparing the above results with those of the previous section gives the following system of equations which relate the Perspective transform parameters A, B, C, D, E, F, G, and H. Thus from the curve fitting provided to the Affine transform parameters of the local image areas, the Perspective transform parameters can be detected.

$$a_0=A-CG$$

$$b_0=B-CH$$

$$c_0=D-FG$$

$$d_0=E-FH$$

$$a_u=-2AG$$

$$a_v=b_u=-AH-BG$$

$$b_v=-2BH$$

$$c_u=-2DG$$

$$c_v=d_u=-DH-EG$$

$$d_v=-2EH$$

The ten values on the left-hand side are determined from the calculated local Affine transform. This leaves an over specified system of ten equations with eight unknowns. Accordingly, the system of equations can be solved, providing the parameters of the applied Perspective transform. The transform can then be reversed, yielding an approximation of the original image from which the embedded data may be decoded.

It is worth noting, that for a sequence of video images recorded by a camcorder, the applied Perspective transform is unlikely to change rapidly. Therefore, when decoding, the transform parameters need not be calculated independently for each frame. In addition, when the transform does change, it is unlikely to be greatly different from that previously detected. This can be used to reduce the parameter space searched.

Figure 12:
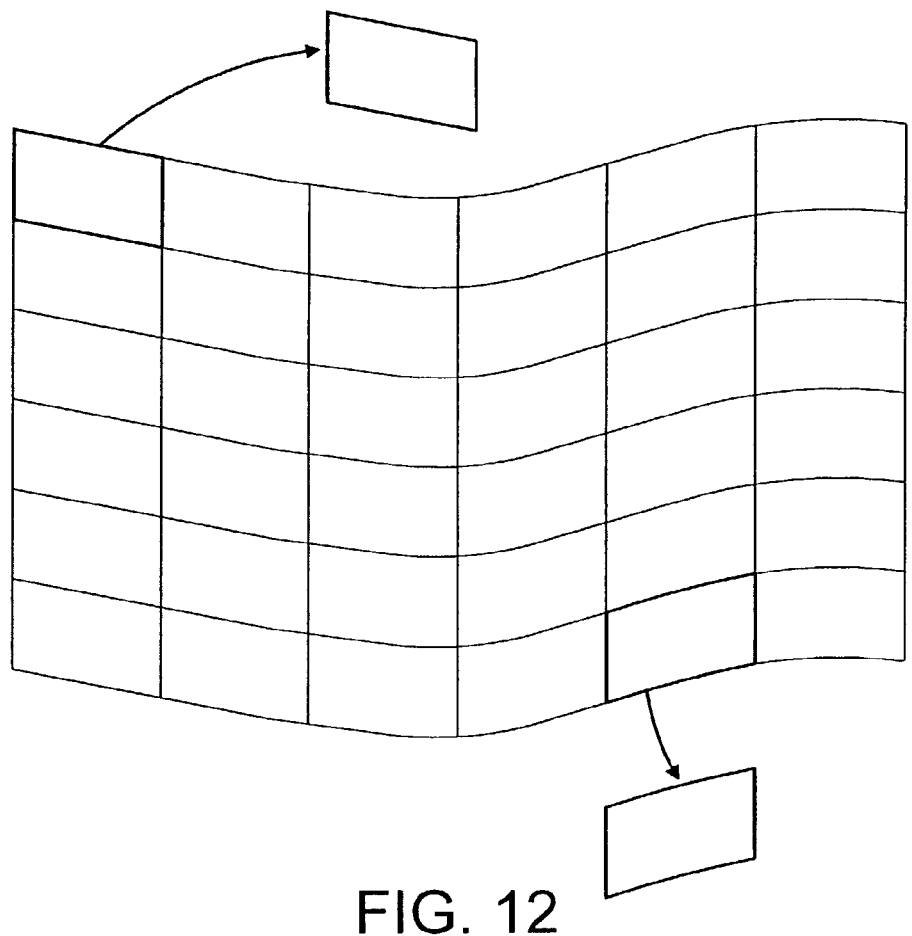
FIG. 12 is a schematic representation of an image, which has suffered from non-linear distortion.

As illustrated in FIG. 12, depending upon the amount of Perspective distortion applied to the image, further estimates of the local Affine transform parameters may be required in other parts of the image. Accordingly, feedback channels 312, 314 are arranged to provide control signals to the image dividing processor 300 and the distortion detection processor 110 in order to estimate the Affine transform parameters of other local parts of the image. Thus, the perspective transform processor 310 can generate further samples of the Affine transform of local parts of the image in accordance with the amount by which Affine transform parameters of the local parts already analysed differ.

Once the global Perspective transform parameters have been calculated, the Perspective transform can be inverted. As shown in FIG. 11 therefore, the image I' is received at the perspective transform inverter 320 which receives the image I' as a first input and the perspective transform parameters via a second input. Once the Perspective transform has been inverted from the image I', data embedded within the image can be recovered by the data in the recovery processor 130.

The data processor shown in FIG. 11 may also be arranged to correct for more severe distortion. For example, the image illustrated in FIG. 10 may appear as illustrated in FIG. 12 in which the severe distortion has caused the image to be warped. In order to invert the distortion represented by the image in FIG. 12, the Perspective transform processor 310 is arranged to apply a curve-fitting process to the Affine transform parameters determined for each of the local parts of the image.

A person skilled in the art is well acquainted with curve fitting in which the coefficients of a polynomial are adapted in order to fit points identified in a plane. Thus, with the Affine transform parameters identifying the points corresponding to the locally determined distortion of the image, coefficients of the polynomial can be estimated so that the parameters which define the warped Perspective distortion can be evaluated. After these parameters have been evaluated using the curve-fitting algorithm, the perspective transform inverter 320 as before can invert the image distortion.

Iterative Processing

After a first iteration of the data processing apparatus shown in FIG. 11 to correct for distortion according to the estimated parameters of the Perspective transform a corrected version of the image is produced. The data processing apparatus can then be arranged to re-calculate the Perspective transform parameters for the corrected version of the image. The re-calculated Perspective transform parameters can then be used to inverse the transform for the corrected image producing a second corrected version. Accordingly, the data processing apparatus can be used to correct for Perspective distortion in an iterative manner by repeating the calculation of the Perspective transform parameters for the corrected image and inverting the Perspective transform according to the re-calculated parameters representing any remaining distortion. For this reason, the Perspective transform processor of FIG. 11 receives via a control channel 316 the corrected image. A current version of the corrected image is also stored in a data store 318, along with a copy of the Perspective transform parameters used to form the corrected image. Under control of the Perspective transform processor 310 the corrected image is fed back to the transform detection processor 110. The corrected image may optionally be fed back to the image dividing processor 300, if the corrected image is to be divided in a different way to the original image. As will be appreciated the operations of the image dividing processor 300, the detection processor 110 and the Perspective transform processor are repeated in order to calculate a further set of Perspective transform parameters for the corrected image. The corrected image is then read from the data store under the control of the Perspective transform processor 310, and fed to the Perspective transform inverter 320, which is also arranged, as before, to receive the further set of Perspective transform parameters.

Correction of the Perspective transform may therefore be performed iteratively. The Perspective transform processor may also be arranged to compare the Perspective transform parameters for the latest version of the corrected image with the Perspective transform parameters for the previous corrected version, which have been stored with the previous version of the image in the data store 318. By comparing the transform parameters for the current and the previous versions of the corrected image, the Perspective transform processor 310 can determine whether an amount of distortion, which may remain in the current corrected image, is within a predetermined tolerance. The predetermined tolerance may be set to a level at which further iterations cannot be expected to remove distortion, which may remain in the image.

If the distorted image is a still image, the data processing apparatus of FIG. 11 can be arranged to repeat the distortion correction process as described above, until an amount of distortion remaining as determined by the calculated Perspective transform parameters, is within a predetermined tolerance. If the image is provided from one or more frames of moving video images, then although the data processing apparatus may operate to process iteratively, each of the iterations may be performed on different images.

As mentioned above, for a moving video image comprising a number of image frames, the distortion to the images is typically unlikely to change greatly between successive frames. For this reason and to save on an amount of processing required to correct for the distortion of the video images, distortion of a current image frame is first corrected by performing an inverse transform in accordance with the Perspective transform parameters estimated for a previous image frame. Perspective transform parameters are then re-calculated for the current image frame, and only if there is a significant difference in the image parameters is the Perspective transform inverted to remove distortion, which differs. Alternatively, the same Perspective transform parameters could be used for a predetermined number of frames, after which a further set of transform parameters are calculated on an image frame corrected using the previous transform parameters. It will be appreciated that an advantage is provided in reducing an amount of processing power required to correct for distortion to video images or alternatively using an available amount of processing power more efficiently.

Further Embodiments

As will be appreciated embodiments of the present invention can be used to both detect distortion and correct for distortion experienced by a data signal. However a particular application is to provide an improved facility for recovering data, which has been embedded in material. For example, if the material is video material which has been distorted in some way, the distortion may have an effect of reducing the likelihood of correctly recovering the embedded data.

As illustrated in FIG. 1, it is known that pirate copies of films can be produced by a person recording the film using a video camera in a cinema at which the film is being shown. The effect of recording the film using a video camera can distort the recorded film in accordance with a relative perspective view of the cinema screen from the camera. The distortion can have an effect of reducing the likelihood of correctly recovering the embedded data.

As disclosed in [1] data may be embedded in material such as, for example, video material. This embedded data may be meta data, which identifies the content of the material. In another example the embedded data may be a unique or substantially unique identifier, which can be used to identify the material, providing the owner with a facility for asserting intellectual property rights in the material.

As will be appreciate in some embodiments of the invention the image may already be presented in a form in which the frequency bands can be accessed. Accordingly, embodiments of the present invention can provide a detection processor operable to identify distortion of a data signal in accordance with a relative frequency change between versions of a template signal recovered from first and second frequency bands of the data signal.

Embedding and Recovering Data

A short explanation will now be given of a process through which data may be embedded and recovered from material. Further details are provided in [1].

Generally, an example arrangement for embedding data may comprise a pseudo-random sequence generator, a modulator, a Wavelet transformer, a combiner and an inverse Wavelet transformer.

The pseudo-random sequence generator produces a Pseudo Random Bit Sequence (PRBS), which is fed to the modulator. The modulator is operable to modulate each copy of a PRBS, with each bit of payload data to be embedded. In preferred embodiments, the data is modulated by representing the values of each bit of the PRBS in bipolar form ('1' as +1, and '0' as −1) and then reversing the polarity of each bit of the PRBS, if the corresponding bit of the payload data is a '0' and not reversing the polarity if the corresponding bit is a '1'. The modulated PRBS is then embedded in the material in the transform domain. The Wavelet transformer converts the image into the Wavelet domain. The combiner embeds the payload data into the image, by adding, for each bit of the modulated PRBS a factor α scaled by ±1, in dependence upon the value of the modulated PRBS. Each coefficient of a predetermined region of the Wavelet domain image is encoded according to the following equation:

$$X'_i = X_i + \alpha_n W_n$$

Where $X_i$ is the i-th wavelet coefficient, $\alpha_n$ is the strength for the n-th PRBS and $W_n$ is the n-th bit of the payload data to be embedded in bipolar form. Therefore the image is converted from the spatial to the Wavelet transform domain, the combiner adds the PRBS modulated data to the Wavelet domain image, in accordance with application strength a and the image is then inverse Wavelet transformed.

The modulated PRBS effectively forms a spread spectrum signal representing the payload data. As a spread spectrum signal, a reduction can be made in the strength of the data to be embedded in the image. By cross-correlating the data in the transform domain image to which the modulated PRBS has been added, with a copy of the PRBS, a correlation output signal is produced with a so called correlation coding gain which allows the modulated data bit to be detected and determined. As such, the strength of the data added to the image can be reduced, thereby reducing any perceivable effect on the spatial domain image. The use of a spread spectrum signal also provides an inherent improvement in robustness of the image because the data is spread across a larger number of transform domain data symbols.

Therefore, in order to recover the embedded data from the image, a Wavelet transformer converts the watermarked image into the transform domain. The Wavelet coefficients to which the PRBS modulated data were added by the combiner are then read from the Wavelet bands. These Wavelet coefficients are then correlated with respect to the corresponding PRBS, which was used to embed the data. Generally, this correlation is expressed as the equation below, where $X_n$ is the n-th wavelet coefficient and $R_n$ is the R-th bit of the PRBS generated by the pseudo random sequence generator.

$$C_n = \sum_{i=1}^{s} X_{sn+i} R_i$$

The relative sign of the result of the correlation $C_n$ then gives an indication of the value of the bit of the embed data in correspondence with the sign used to represent this bit in the embedder.

As will be appreciated, as well as embedding data in a data signal or image, the template signal may be added and detected in a corresponding way.

Various modifications may be made to the embodiments herein before described without departing from the scope of the present invention. In particular as illustrated, embodiments of the present invention may be used with a one-dimensional data bearing signal such as that represented as amplitude with respect to time as well as with two-dimensional signals such as images or other material.

REFERENCES

[1] Co-pending UK patent applications numbers 0029859.6, 0029858.8, 0029863.8, 0029865.3, 0029866.1 and 0029867.9.

[2] "Affine Transformation", www.dai.ed.ac.uk/HIPR2/affine.htm.

What is claimed is:

1. A data processing apparatus operable to modify an image data signal representative of an image so that a subsequent non-linear distortion applied to said image may be determined, said data processing apparatus being operable to combine at least first and second template signals into first and second different frequency bands respectively of said image data signal, said first template signal and said second template signal being copies of the same reference signal and are combined in said first and second bands with the effect that distortion of said data signal produces a detectable relative change in frequency between said first and said second template signals.

2. A data processing apparatus as claimed in claim 1, comprising
   a transform processor operable to transform said image data signal into the transform domain, said transform domain providing said frequency component bands to which said template signal is introduced.

3. A data processing apparatus as claimed in claim 2, wherein said transform processor is operable to transform said image into the Wavelet domain, in accordance with the Wavelet transform, said bands into which said template signal is introduced being Wavelet bands.

4. A data processing apparatus as claimed in claim 1, wherein said reference signal is a predetermined noise signal.

5. A data processing apparatus as claimed in claim 4, wherein said predetermined noise signal is generated from a Pseudo Random Bit Sequence (PRBS).

6. A data processing apparatus as claimed in claim 1, wherein said reference signal is derived from the frequency component signal from one of the frequency component bands.

7. A data signal representative of an image into which first and second template signals have been introduced by the data processor according to claim 1.

8. A data carrier having recorded thereon a data signal according to claim 7.

9. A method of processing data representative of an image to modify said image so that a subsequent non-linear distortion applied to said image may be determined, said method comprising combining at least first and second template signals into different first and second frequency bands respectively of a data signal representative of an image, said first template signal and said second template signal being copies of the same reference signal and are combined in said first and second bands with the effect that distortion of said data signal produces a detectable relative change in frequency between said first and said second template signals.

10. A data processing apparatus operable to modify data representative of an image so that a subsequent non-linear distortion applied to said image may be determined, said apparatus comprising:
 (a) means for combining at least first and second template signals into first and second frequency bands respectively of a data signal representative of an image, said first template signal and said second template signal being copies of the same reference signal; and
 (b) means for combining said first and second bands with the effect that distortion of said data signal produces a detectable relative change in frequency between said first and said second template signals.

11. A data processing apparatus operable to determine non-linear distortion applied to an image in which template signals have been introduced into at least first and second frequency bands of said image respectively by a data processing apparatus operable to combine at least first and second template signals into said first and second frequency bands, said template signals having a predetermined relationship with each other and being combined in said first and second bands with the effect that distortion of said data signal produces a detectable relative change in frequency between said first and said second template signals, said apparatus comprising
 a transform detection processor operable to generate at least one parameter representative of a linear transformation applied to each of selected parts of said image, and
 a non-linear transform processor operable to estimate parameters of a non-linear transformation representative of said non-linear distortion applied to said image from the linear transform parameters of at least two parts of said image.

12. A data processing apparatus as claimed in claim 11, an image dividing processor operable to generate data representative of said selected parts of said image, said transform detection processor being arranged to generate the transform parameters for each of said selected parts.

13. A data processing apparatus as claimed in claim 11, wherein said transform detection processor is operable to generate at least one parameter representative of a linear transformation applied to each of said parts of said image, by detecting a frequency change between the template signals recovered from said first and second frequency bands, and generating said parameters in accordance with a relationship between said at least one parameter and said frequency distortion.

14. A data processing apparatus as claimed in claim 11, wherein said non-linear transform processor is operable to combine the linear transform parameters of at least two parts of said image to produce said non-linear transform parameters.

15. A data processing apparatus as claimed in claim 11, wherein said non-linear transform processor is operable
 to compare the linear transform parameters of at least two parts of said image, and if said linear transform parameters differ by more than a predetermined amount,
 to control said image dividing processor and said transform detection processor to generate data representative of at least one further part of said image,
 to estimate linear transform parameters representative of linear distortion applied to said at least one further part of said image, and
 to estimate said non-linear distortion in accordance with said linear transform parameters for said at least one further part of said image in combination with transform parameters already determined for said at least two parts of said image.

16. A data processing apparatus as claimed in claim 11, wherein
 said non-linear transform processor is operable to estimate the parameters of the non-linear transform by translating the linear transform parameters determined for different parts of said image, in accordance with a relationship representing a prediction of said non-linear transform from said linear transform parameters.

17. A data processing apparatus as claimed in claim 16, wherein said non-linear distortion is representative of a Perspective transform applied to said image, said non-linear transform estimator being operable to estimate at least six parameters of said Perspective transform applied to said image in accordance with said prediction of said non-linear parameters from said linear transform parameters of said parts of said image, in accordance with said predetermined relationship.

18. A data processing apparatus as claimed in claim 16, wherein said non-linear distortion is representative of a Polynomial transform applied to said image, said non-linear transform processor being operable to estimate n parameters of said Polynomial transform applied to said image in accordance with said prediction of said non-linear parameters from said linear transform parameters of said parts of said image, in accordance with said predetermined relationship.

19. A data processing apparatus as claimed in claim 11, wherein said linear transform is the Affine transform and said detection processor is operable to determine at least four transform parameters representative of said linear distortion of each of said parts of said image.

20. A data processing apparatus as claimed in claim 19, wherein said detection processor comprises
 a frequency component processor operable to generate data representative of the frequency components of said first and said second frequency bands of said image, by transforming said image into a transform domain in which said frequency components of said image are provided.

21. A data processing apparatus as claimed in claim 20, wherein said transform is the discrete Wavelet transform, said frequency bands being provided as Wavelet bands.

22. A data processing apparatus as claimed in claim 11, wherein said detection processor is operable
 to generate data representing versions of said template signal recovered from said first and said second frequency bands, to multiply the samples of said recovered template signal from said first frequency band, with corresponding samples of said template signal from said second frequency band to produce product signal samples, to transform said product signal samples into the frequency domain, to determine said relative change in frequency from at least one sample of said frequency domain product samples having a larger amplitude than the others, and to determine the values of said transform parameters from the co-ordinates of said larger magnitude product samples in a two-dimensional frequency components.

23. A data processing apparatus as claimed in claim 11, comprising an inverse transform processor operable to receive said data representative of said distortion and said image signal and to reverse said distortion of said image to form a corrected version of said image.

24. A data processing apparatus as claimed in claim 23, wherein said non-linear transform processor is coupled to said transform detection processor and said inverse transform processor is operable to receive data representative of said corrected version of said image, and in combination with said detection processor to generate second Perspective transform parameters representative of remaining distortion of said corrected image, from further linear transform parameters generated by said detection processor, said inverse transform processor being operable to form a second version of the corrected image by reversing said distortion of said corrected image in accordance with said second Perspective transform parameters.

25. A data processing apparatus as claimed in claim 24, comprising a data store, wherein said non-linear transform processor is operable to store said non-linear transform parameters determined in order to generate said corrected version of said image, and to compare said second non-linear transform parameters with said stored non-linear transform parameters and in accordance with said comparison to operate in combination with said detection processor to generate third non-linear transform parameters, and to correct for distortion to said second version of said corrected image by reversing said distortion of said second corrected version of said image in accordance with said third Perspective transform parameters.

26. A data processing apparatus as claimed in claim 25, wherein said comparison comprises calculating a difference between at least one of said non-linear parameters and a corresponding one of said second non-linear parameters and comparing said difference with a predetermined threshold and if said difference is above said threshold generating said third non-linear transform parameters and otherwise not generating said third non-linear transform parameters for generating said second corrected version of said image.

27. A data processing apparatus as claimed in claim 24, wherein said image signal is a video signal comprising a plurality of image frames, said non-linear transform processor operating in combination with said detection processor and said inversion processor to generate said corrected version for one of said frames and after a predetermined number of frames generating from a subsequent image frame said second corrected version of said subsequent image frame.

28. A data processing apparatus as claimed in claim 23, comprising a data store, wherein said image signal is a video signal comprising a plurality of images, and said non-linear transform processor is coupled to said detection processor and is operable to store first non-linear transform parameters calculated for a first of said images in said data store, and said inversion processor is operable to correct the distortion of a subsequent plurality of said images by inverting the transform according to said first non-linear transform parameters to generate corrected versions of said first plurality of images.

29. A data processing apparatus as claimed in claim 28, wherein said non-linear transform processor is operable in combination with said inversion processor to generate corrected versions of a first plurality of said images using said first non-linear transform parameters, and to generate for a second of said images a first corrected version of said second image using said first non-linear transform parameters, and to generate second non-linear transform parameters for said first corrected version of said second image, said second non-linear transform parameters being used to generate a second corrected version of said second image, and said second non-linear transform parameters are used to correct the distortion for a second subsequent plurality of said images.

30. A data processing apparatus operable to detect data embedded in material, the material having template signals present in at least first and second frequency bands respectively, said template signals having a predetermined relationship with each other, said apparatus comprising a distortion detection data processing apparatus as claimed in claim 23, operable to determine parameters of a non-linear transform representative of the distortion of the material, wherein said inversion processor is operable to receive said data representative of distortion determined by said distortion detection data processing apparatus and data representative of said material and to reverse said distortion of said material, and a data detector operable to recover said embedded data from said material.

31. A data processing apparatus as claimed in claim 30, wherein said embedded data is identifiable by the owner of said material.

32. A data processing apparatus as claimed in claim 30, wherein said embedded data is a UMID or a part thereof.

33. A data processing apparatus as claimed in claim 30, wherein said embedded data is meta data describing the content of said data signal.

34. A computer program providing computer executable instructions, which when loaded onto a data processor configures the data processor to operate as the data processing apparatus according to claim 11.

35. A computer program product having a computer readable medium recorded thereon information signals representative of the computer program claimed in claim 34.

36. A method of processing data representative of an image to determine non-linear distortion applied to the image in which template signals have been introduced into at least first and second frequency bands of said image respectively by combining at least first and second template signals into said first and second frequency bands, said template signals having a predetermined relationship with each other and being combined in said first and second bands with the effect that distortion of said data signal produces a detectable relative change in frequency between said first and said second template signals, said method comprising:

(a) generating data representative of selected parts of said image, (b) generating at least one parameter representative of a linear transformation applied to each of said parts of said image, and (c) estimating parameters of a non-linear transformation representative of said non-linear distortion applied to said image from the linear transform parameters of at least two parts of said image.

37. A computer program providing computer executable instructions, which when loaded on to a data processor causes the data processor to perform the method according to claim 36.

38. A data processing apparatus operable to process data representative of an image to determine non-linear distortion applied to the image in which template signals have been introduced into at least first and second frequency bands of said image respectively by a data processing apparatus comprising:
(a) means for combining at least first and second template signals into first and second frequency bands respectively of a data signal representative of an image, said template signals having a predetermined relationship with each other,
(b) means for combining said first and second bands with the effect that distortion of said data signal produces a detectable relative change in frequency between said first and said second template signals,
(c) means for generating data representative of selected parts of said image,
(d) means for generating at least one parameter representative of a linear transformation applied to each of said parts of said image, and
(e) means for estimating parameters of a non-linear transformation representative of said non-linear distortion applied to said image from the linear transform parameters of at least two parts of said image.

39. A data processing apparatus operable to determine non-linear distortion applied to an image in which template signals have been introduced into at least first and second frequency bands of said image respectively by a data processing apparatus operable to combine at least first and second template signals into said first and second frequency bands, said first template signal and said second template signal being copies of the same reference signal and being combined in said first and second bands with the effect that distortion of said data signal produces a detectable relative change in frequency between said first and said second template signals, said apparatus comprising:
a transform detection processor operable to generate at least one parameter representative of a linear transformation applied to each of selected parts of said image; and
a non-linear transform processor operable to estimate parameters of a non-linear transformation representative of said non-linear distortion applied to said image from the linear transform parameters of at least two parts of said image.

40. A method of processing data representative of an image to determine non-linear distortion applied to the image in which template signals have been introduced into at least first and second frequency bands of said image respectively by combining at least first and second template signals into said first and second frequency bands, said first template signal and said second template signal being copies of the same reference signal and being combined in said first and second bands with the effect that distortion of said data signal produces a detectable relative change in frequency between said first and said second template signals, said method comprising:
(a) generating data representative of selected parts of said image;
(b) generating at least one parameter representative of a linear transformation applied to each of said parts of said image; and
(c) estimating parameters of a non-linear transformation representative of said non-linear distortion applied to said image from the linear transform parameters of at least two parts of said image.

41. A data processing apparatus operable to process data representative of an image to determine non-linear distortion applied to the image in which template signals have been introduced into at least first and second frequency bands of said image respectively by a data processing apparatus comprising:
(a) means for combining at least first and second template signals into first and second frequency bands respectively of a data signal representative of an image, said first template signal and said second template signal being copies of the same reference signal;
(b) means for combining said first and second bands with the effect that distortion of said data signal produces a detectable relative change in frequency between said first and said second template signals;
(c) means for generating data representative of selected parts of said image;
(d) means for generating at least one parameter representative of a linear transformation applied to each of said parts of said image; and
(e) means for estimating parameters of a non-linear transformation representative of said non-linear distortion applied to said image from the linear transform parameters of at least two parts of said image.

* * * * *